United States Patent [19]

Östberg

[11] 4,334,606
[45] Jun. 15, 1982

[54] ALLOCATING MEANS FOR SAWMILLS

[75] Inventor: Sven E. Östberg, Söderhamm, Sweden

[73] Assignee: Kockums Industri AB, Sweden

[21] Appl. No.: 124,846

[22] Filed: Feb. 26, 1980

[30] Foreign Application Priority Data

Feb. 27, 1979 [SE] Sweden .............................. 7901728

[51] Int. Cl.³ .................... B65G 47/12; B65G 47/26
[52] U.S. Cl. .............................. 198/443; 144/242 R; 83/104
[58] Field of Search .................... 198/443, 451, 49 Z; 144/312, 242 R; 83/104, 167

[56] References Cited

U.S. PATENT DOCUMENTS

| | | | |
|---|---|---|---|
| 3,304,824 | 2/1967 | Hess, Sr. et al. | 83/104 |
| 3,443,676 | 5/1969 | Biloco et al. | 198/436 |
| 3,815,763 | 6/1974 | Biloco et al. | 198/492 |

Primary Examiner—Robert B. Reeves
Assistant Examiner—Brian Bond
Attorney, Agent, or Firm—Hill, Van Santen, Steadman, Chiara & Simpson

[57] ABSTRACT

An allocating means for sorting or allocating of side boards individually immediately after sawing of logs into a main yield and a number of side boards. The allocating means comprises a longitudinal conveyor (10) for the main yield and movable support rolls (11, 12) for the side boards. Below the support rolls there are disposed stops (16, 17) for the side boards and in level with the stops there are disposed arresting means in the form of suction plates (18, 19) adapted to first hold one side board of each pair whereas the other one of that pair is permitted to fall into a compartment of a cross-conveyor, and then to free also that second side board of the pair so that it falls into a further compartment of the cross-conveyor for individual transport to a place for further handling.

5 Claims, 12 Drawing Figures

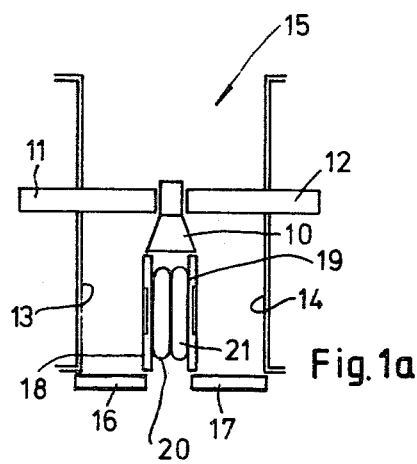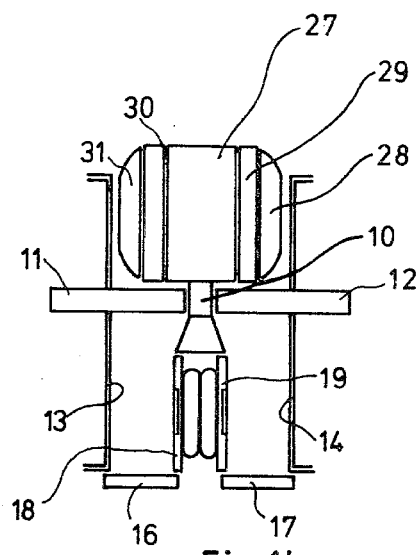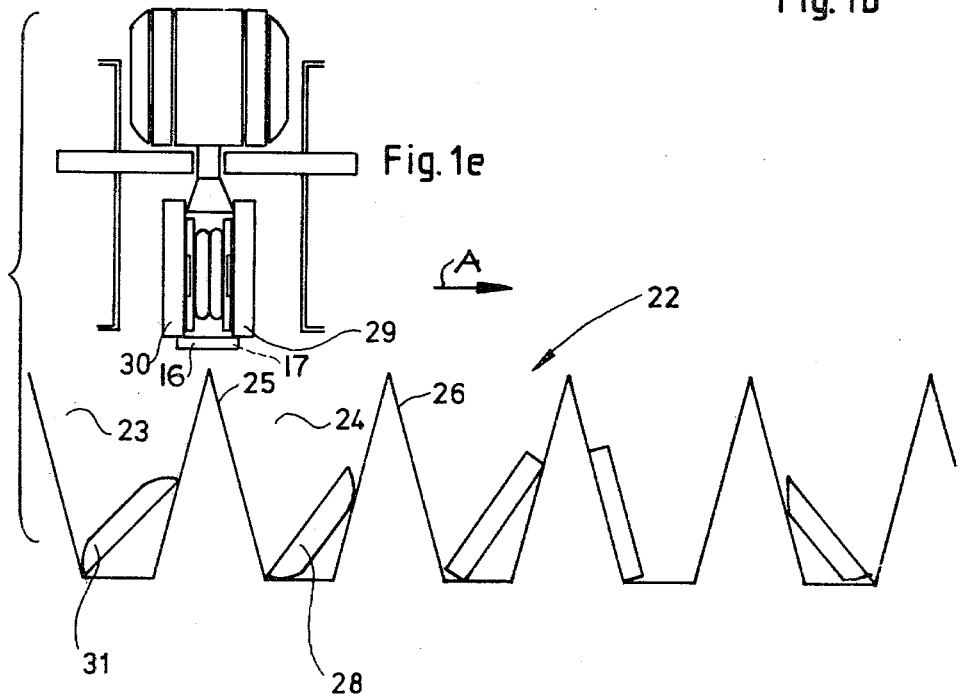

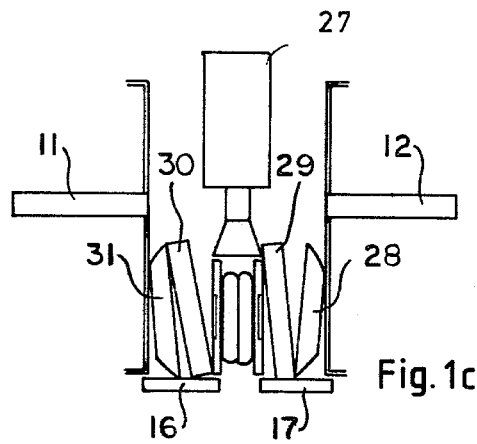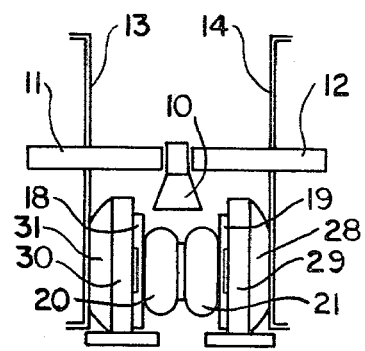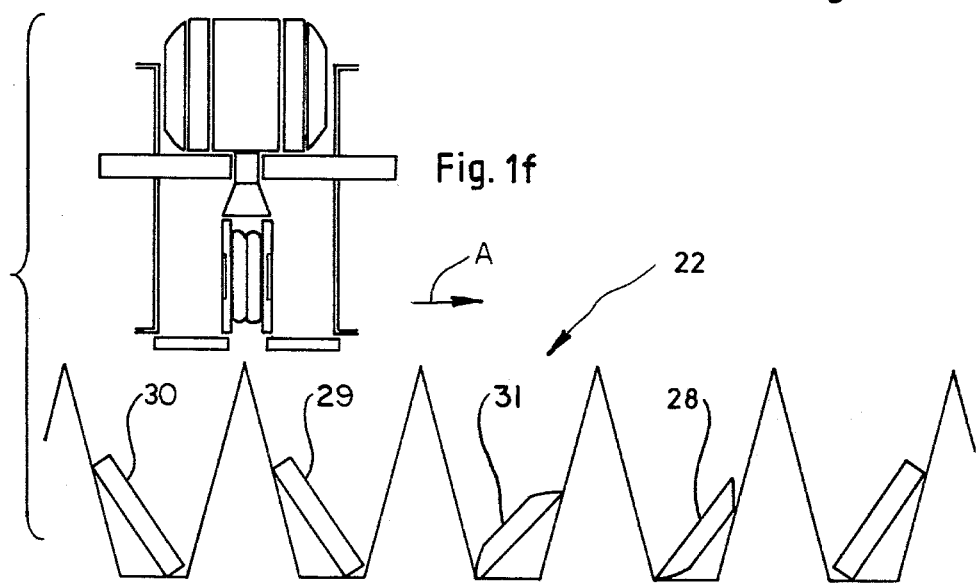

ALLOCATING MEANS FOR SAWMILLS

BACKGROUND OF THE INVENTION

1. Field of the Invention

This invention relates to an allocating means for sawmills, particularly for allocating sideboards individually immediately after sawing of logs into a main yield and a number of sideboards.

2. Prior art

In sawmills it is a well recognized problem to sort out or allocate the sideboards after sawing of the logs into a main yield and a varying number of sideboards.

For example, such a sorting or allocation may be performed under a continuous longitudinal transport of the main yield and sideboards, but this requires long buildings. Instead, it is more common to collect the sideboards at random in heaps, from which, the boards are then sorted out individually by means of manned so called "board horses". This work is cumbersome and monotonous, and requires use of unnecessarily many manual workers.

SUMMARY OF THE INVENTION

The present invention has for its object to provide an allocating means for sawmills, especially for allocating sideboards individually immediately after sawing of logs into a main yield and a number of sideboards, wherein the above mentioned disadvantages are avoided, and at the same time certain functional advantages are achieved.

Advantageous features and details are defined in the following specification, with reference to the accompanying drawings, and in the claims.

The invention is now described in more detail with reference to the accompanying drawings wherein a number of embodiments are shown.

ON THE DRAWING

FIGS. 1a–1f show schematically one embodiment of an allocating means according to the invention in successive steps of one operational cycle;

AS SHOWN ON THE DRAWING

Figure 2A:
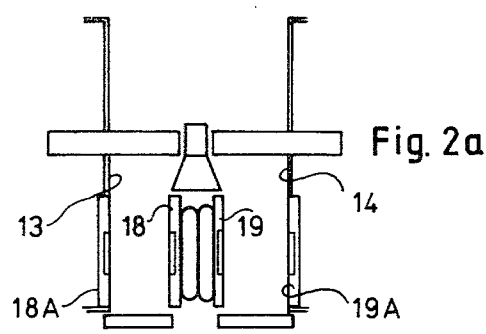
FIGS. 2a–2e show a second embodiment in successive steps of one operational cycle.
Figure 2B:
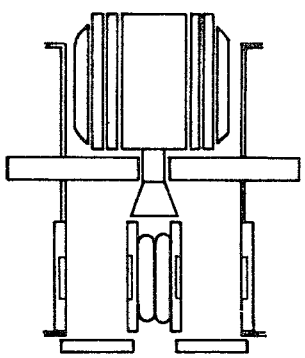
Figure 2E:
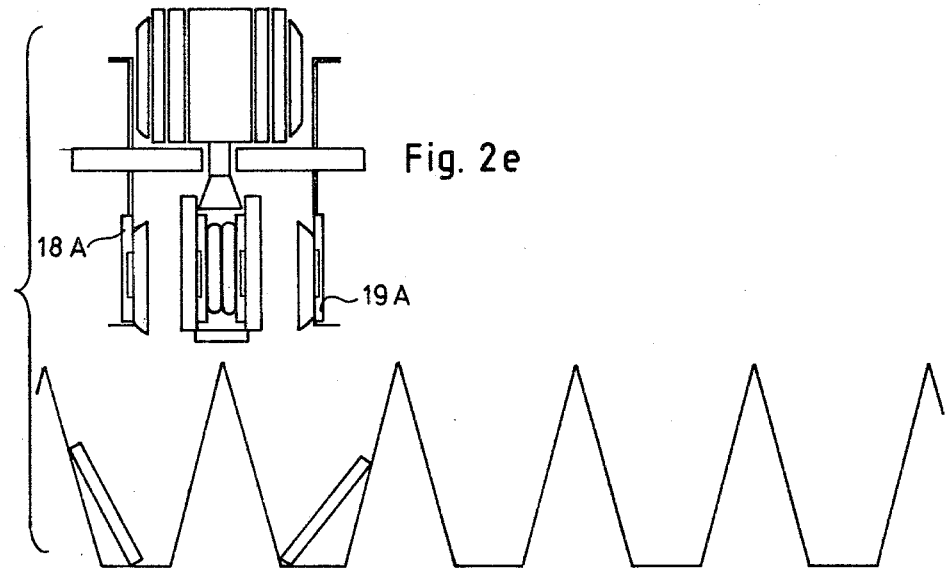
Figure 2C:
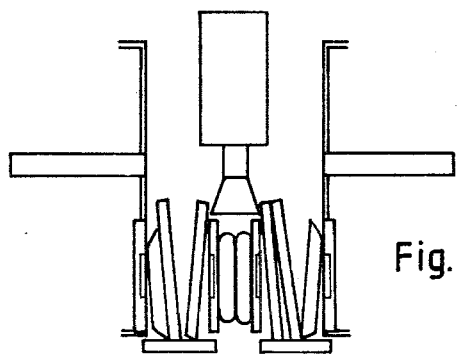
Figure 2D:
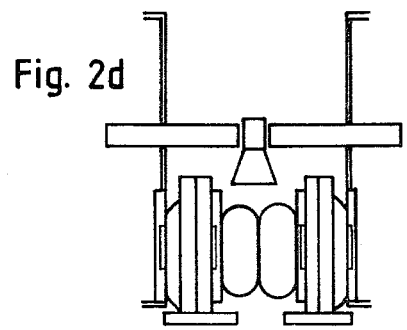

In the embodiment as shown in FIGS. 1a–1f, the allocating means according to the invention comprises a plurality of supports, preferably in the shape of a pair of support rolls 11, 12, disposed along a conveyor chain 10 at both sides thereof. The rolls 11, 12 are rotatably journalled on an axis perpendicular to the longitudinal direction of the conveyor chain 10. Further, the allocating means comprises a pair of side support or lateral guide means 13, 14, disposed at both sides of the conveyor chain 10 and slightly spaced therefrom. These supports or guide means 13, 14 form a channel, generally denoted 15. The channel 15 is downwardly open but has a pair of movable arresting members 16, 17 at the under side thereof. Further, the channel 15 is provided with suction plates 18, 19, which are disposed below the chain 10 and are movable transversely of the chain 10, in the instant case by means of a pair of bellows 20, 21. Such suction plates are provided in the requisite number and are spaced along the length of the chain 10. The dimensions and the suction forces of the suctions plates are adapted to the requirements in each particular case. Finally, the allocating means comprises a conveyor 22, shown only in FIGS. 1e and 1f, which conveyor 22 is disposed below the channel 15 and is movable transversely of the conveyor chain 10 as is indicated by the arrow A in FIGS. 1e and 1f. The conveyor 22 is divided into boxes or compartments 23, 24 etc by means of suitable partitions 25, 26.

The embodiment as described above with reference to FIGS. 1a–1f operates in the following manner:

As shown in FIG. 1b, the main yield 27 of the sawn log is conveyed longitudinally on the conveyor chain 10 while the side boards 28, 29, 30, 31 are supported by the rolls 11, 12, and the side supports or guide means 13, 14 hold the side boards against tipping laterally outwardly.

When the log has been sawn up to its full length the main yield 27 is held on the conveyor chain 10 in any suitable and known way, such as by means of upper hold down rolls (not shown). The rolls 11, 12, on the other hand, are quickly retracted along their axes sidewardly, FIG. 1c, to permit the side boards 28, 29, 30, 31, to fall onto the stops 16, 17, on which the side boards are momentarily arrested against a further movement downwardly.

Then the support rolls 11, 12 are returned to supporting position adjacent the conveyor chain 10, FIG. 1d, and simultaneously the suction plates or gripping members 18, 19 are actuated away from each other by means of the bellows 20, 21 whereby the pairs of side boards 28, 29 and 30, 31, respectively, are straightened up and moved into abutting position in relation to the side supports or lateral means 13, 14 of the channel 15, at the same time as the suction plates or gripping members 18, 19 of course are moved into intimate abutting relationship with the adjacent surfaces of the side boards 29, 30. Thereby these "innermost" side boards are sucked firmly against the suction plates or gripping members 18, 19 in a manner known per se, Then the force of the bellows 20, 21 is released, at the same time as the stops 16, 17 are moved out of the way, whereby the outermost side boards 28, 31 fall down into the boxes 23, 24 in the underlying conveyor 22, as there is nothing left that might retain the outermost side boards 28, 31. Thus, the conveyor 22 will be fed with one board in each box for transport to the next operational step, e.g. an edge trimmer. Following the above described steps, the conveyor 22 is moved one step forward in the direction of the arrow A to make further boxes available, whereupon the suction force of the suction plates or gripping members 18, 19 is released so that the innermost boards 29, 30 fall down into their boxes in the conveyor. Finally, the stops 16, 17 are moved back to their initial position.

During the above described operation the next log is sawn and fed out on the allocating means according to FIGS. 1e and 1f, whereupon the described cycle is repeated.

The embodiment in FIGS. 2a–2e corresponds in principle with the one as described above but is intended for three side boards on each side of the main yield. In this case, also the side supports or lateral guide means 13, 14 of the channel are provided with suction plates, here denoted 18A, 19A, and the design and movements of the conveyor 22 are adapted to the greater number of side boards on each side of the main yield.

Figure 3:
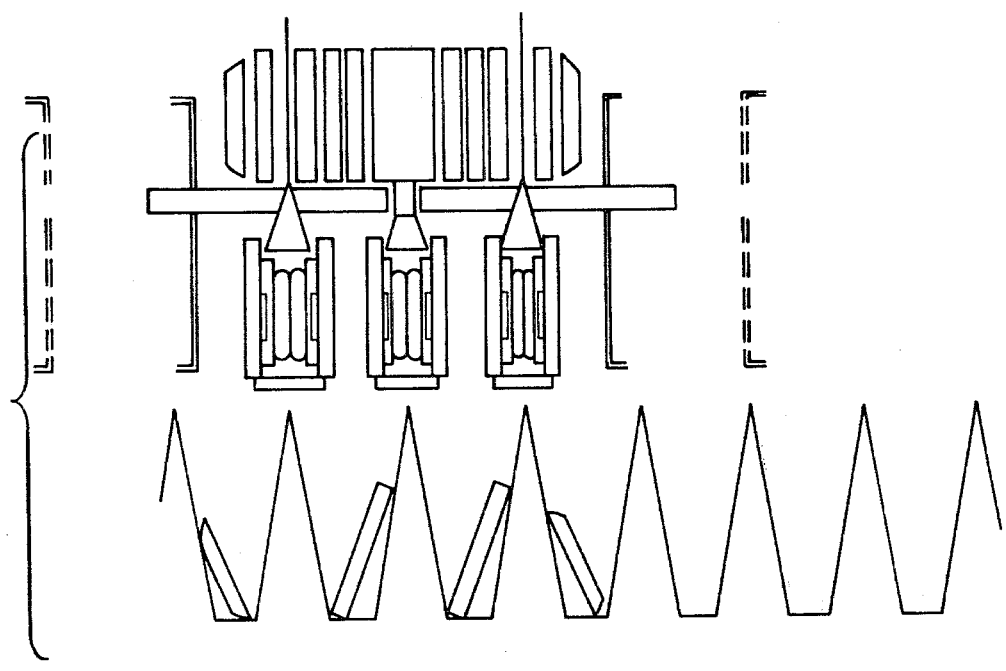
FIG. 3 is a schematic end view of a third embodiment.

It is not necessary to repeat the function of the embodiment according to FIGS. 2a–2e and according to FIG. 3 in as much as these embodiments function on the same principle as the embodiment of FIGS. 1a–1f.

It would appear to be possible to use the allocating means according to the invention also to sort out slabs if the suction plates are designed in such a manner that they function also against the arcuate raw surfaces of the slabs.

Modifications and alterations as to details may be carried out within the scope of the invention.

I claim as my invention:

1. An allocating means for handling individual side boards immediately after a log has been sawed into a main yield and a number of sideboards on each side thereof, comprising:
(a) a longitudinal conveyor for transporting the main yield lengthwise;
(b) a pair of retractable sideboard supports respectively disposed at each side of said longitudinal conveyor for supporting the sideboards from below until retracted;
(c) a pair of stationary lateral guide means for laterally guiding the sideboards on said supports;
(d) a number of releasable gripping members between said pair of guide means and below said retractable supports, one for each pair of the sideboards, disposed at a level below said longitudinal conveyor, and adapted to momentarily grip one of each pair of the sideboards while permitting the other one to fall further; and
(e) a cross-conveyor disposed below said gripping members, and having compartments receptive of individual falling sideboards.

2. An allocating means according to claim 1, including a pair of movable stops disposed adjacent to said gripping members and adapted to stop all the falling sideboards at a position in registration with said arresting members to enable said gripping member to grip the adjacent sideboard, the ungripped sideboards being permitted to resume falling toward said cross-conveyor in response to retracting movement of said stops.

3. An allocating means according to claim 1 or 2, said gripping members being suction plates drivably movable toward and away from said sideboards and having apertured faces engageable with the sideboard surfaces.

4. An allocating means according to claim 3, including a pair of bellows disposed to selectively reciprocably drive said suction plates.

5. An allocating means according to claim 1 or 2 said pair of lateral guide means extending upwardly beyond said longitudinal conveyor, and extending downwardly to the level of the arresting members, thereby defining sidewalls of guide channels in which said sideboards fall.

* * * * *